United States Patent [19]
Minami

[11] 3,918,488
[45] Nov. 11, 1975

[54] CONTROL VALVES FOR STEERING CLUTCHES AND BRAKES

[75] Inventor: Teruo Minami, Hiratsuka, Japan

[73] Assignee: Kabushiki Kaisha Komatsu Seisakusho, Japan

[22] Filed: Nov. 6, 1973

[21] Appl. No.: 413,388

Related U.S. Application Data

[63] Continuation of Ser. No. 158,493, June 30, 1971, abandoned.

[52] U.S. Cl...... 137/596.16; 137/625.64; 192/12 C; 192/13 R; 192/87.18
[51] Int. Cl.² .................. F16K 11/04; F16D 67/04
[58] Field of Search............ 192/87.18, 87.19, 12 C; 137/596.16, 596.14, 625.64

[56] References Cited
UNITED STATES PATENTS

| | | | |
|---|---|---|---|
| 2,700,986 | 2/1955 | Gunn | 137/596.16 |
| 2,983,348 | 5/1961 | Ott | 192/87.18 X |
| 2,997,064 | 8/1961 | Gerwig et al. | 137/625.64 |
| 3,139,908 | 7/1964 | Strader | 192/87.18 X |
| 3,286,734 | 11/1966 | Hartshorne | 137/625.64 |
| 3,417,845 | 12/1968 | Swanson | 192/87.19 |
| 3,587,640 | 6/1971 | Hanser | 137/625.64 |

*Primary Examiner*—Benjamin W. Wyche
*Attorney, Agent, or Firm*—Armstrong, Nikaido & Wegner

[57] ABSTRACT

Controlling device of hydraulic system for steering which comprises providing pressure chambers connected to the fluid supplying ports on both end portions of spools built in a valve in such a manner that the orifice provided between one of said pressure chambers and drain port can be opened and closed by a solenoid valve; and connecting one of said pressure chambers to drain port by opening said orifice to generate pressure difference in said two pressure chambers to the effect that said spool can be operated.

3 Claims, 5 Drawing Figures

CONTROL VALVES FOR STEERING CLUTCHES AND BRAKES

This is a continuation of application Ser. No. 158,493, filed June 30, 1971, and now abandoned.

BRIEF EXPLANATION OF THE INVENTION

The present invention relates to a controlling device of a hydraulic system for a steering mechanism for steering trackless vehicles such as bulldozer.

The object of the present invention is to provide a controlling device for a hydraulic system capable of carrying out accurate remote control by means of a simple structure without requiring a complicated mechanical link mechanism as in the conventional controlling devices of this kind.

Another object of the present invention is to provide the controlling device of a hydraulic system capable of eliminating the complicated maneuvers by the operator, and capable of making the control of brake and steering interlocked by a simple structure without requiring complicated linking mechanism as in the conventional devices of this kind wherein steering mechanism and brake are interlocked.

Other objects of the present invention will be clarified from the following detailed explanations.

The controlling device for a hydraulic system for steering of the present invention is characterized in that a spool is built in a valve having a feeding port and a port for steering as well as a clutch and drain port, and pressure chambers connected respectively to fluid feeding ports are provided on both end portions of the spool of said valve, in such a manner that the orifice provided between one of said pressure chambers and said drain port can be opened and closed by a solenoid valve, and one of said pressure chambers is connected to said drain port by opening said orifice to generate the pressure difference in said two pressure chambers, to the effect that said spool can be operated.

BRIEF EXPLANATION OF THE ATTACHED DIAGRAMS

The attached diagrams show an embodiment of the present invention, and in the diagrams;

DETAILED EXPLANATION OF THE INVENTION

Figure 1:
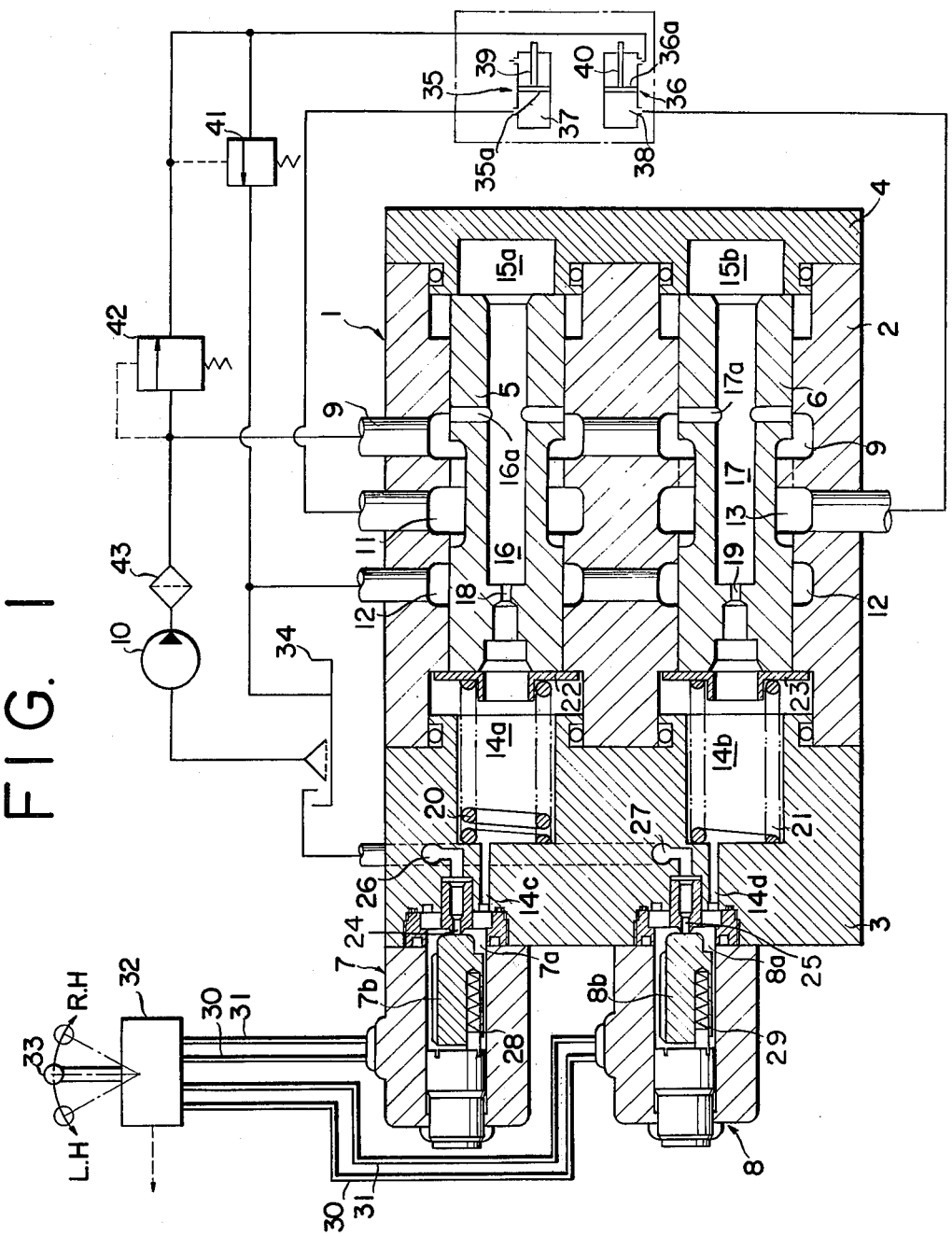
FIG. 1 is a diagram showing partial cross sectional view of an embodiment of this invention.

In the following paragraphs, an embodiment of the present invention is explained in accordance with the attached diagrams;

In FIG. 1, 1 is control valve for a steering clutch of the land type, and said control valve 1 is provided with valve body 2 having covers 3, 4 on both ends thereof, the spool 5 for the left hand steering clutch provided on said valve body 2, the spool 6 for the right hand steering clutch, and the solenoid valves 7, 8 for controlling said spools 5,6 in accordance with electrically operable instructions.

On the other hand, in the above mentioned control valve 1, the feeding ports 9, 9' formed on the valve body 2 are connected to the pump 10, and the spool 5 for the left hand steering clutch opens and closes the port 13 for the right hand steering clutch, feeding port 9, and the drain port 12 respectively.

On the other hand, on both ends of the respective spools 5,6 of the valve body 2, the pressure chambers 14a, 15a, and 14b, and 15b are respectively formed, and the respective pressure chambers 14a, 15a and 14b, 15b are mutually connected by the oil feeding chambers 16,17 and feeding holes 16a, 17a provided on the respective spools 5, 6, and the respective pressure chambers are connected to the feeding port 9.

Orifices 18, 19 are provided between the oil feeding chambers 16, 17 of the spools 5, 6 and the pressure chambers 14a, 14b.

The above mentioned respective spools 5,6 are always forced in the direction in which the drain ports 12, 12 are closed (i.e., to the right in the diagram) by the springs 20, 21 built in the pressure chambers 14a, 14b through the spring sheets 22, 23.

The above mentioned pressure chambers 14a, 14b are connected to the valve chambers 7a, 8a of the respective solenoid valves 7, 8 through the oil feeding apertures 14c, 14d, and the respective valve chambers 7a, 8a are connected to the drain ports 26, 27 through the orifices 24, 25, and the pistons 7b, 8b of the above mentioned solenoid valves 7, 8 are always forced in the direction in which said orifices 24, 25 are closed by the back pressure of the springs 28, 29, and at an same time when magnetically energized by the electric signal, the pistons 7b, 8b of the solenoid valves 7, 8 open the orifices 24, 25.

The opened area of the orifices 18, 19 is formed smaller than that of the orifices 24, 25, and, accordingly, if the orifice 18 and the orifice 24 are, for example, connected in series, the pressure within the pressure chamber 14a intermediate between the orifices 18 and 24 is decreased since the flow amount of oil supplied from the orifice 18 is less than the flow amount drained from the orifice 24 when the orifice 24 is opened.

The respective solenoids of the above mentioned solenoid valves 7, 8 are electrically connected to the control box 32 by means of cords 30, 31, and the control box 32 has electric switch (not shown), and at the same time it has the lever 33 for speed change and steering instructions for operating said switch.

On the other hand, the respective drain ports 12, 26, 27 of the control valve 1 whose structure has been explained in the foregoing paragraphs, are connected to the operation oil tank 34. Also, at the same time, the ports 11 and, 13 for the right and left hand steering clutches, are connected to the pressure chambers 37, 38 on the side where the clutches of the clutch pistons 35a, 36a in the right and left hand steering clutches 35, 36, are connected.

On the other hand, the pressure chambers 39, 40 on the side where clutches of the above mentioned clutch pistons 35a, 36a are cut off, are connected to the operation oil tank 34 through relief valve 41, and at the same time the pressure chambers 39, 40 are connected to the pump 10 through the line filter 43.

The pump 10 is driven by the gear device connected to the engine (not shown).

Thus, when the lever 33 is turned to the right hand (R.H), the electric signal selected by the control box 32 is sent to the solenoid valve 8 by the operation of said lever 33, and said solenoid is energized and the valve piston 8b is operated against the spring 29.

When the orifice 25 is opened by the valve piston 8b the pressure within the pressure chamber 14b is lowered, and the spool 6 is transferred against the spring 21 to the left hand (in the diagram) by the pressure supplied to the oil feeding orifice 17 from the feeding port 9, and the feeding port 9 and the clutch port 13 are cut off by the movement of said spool 6, and at the same time said clutch port 13 and the drain port 12 are connected, and therefore the pressurized fluid of the pressure chamber 38 on the side where the clutch of the right hand steering clutch piston 36a is connected, escapes from the drain port 12, and the right hand steering clutch 36 is cut off.

On the other hand, when said lever 33 is turned back to the neutral position, the valve piston 8b closes the orifice 25 by means of spring 29, and in such a case as this, the pressure within said pressure chamber 14b is abruptly raised, and the spool 6 is restored to the right hand (in the diagram) by said increase of pressure and by the spring force of the spring 29 and the port 13 is connected to the feeding port 9, and thereby pressurized fluid is supplied into the pressure chamber 38 on the side where the clutch of said clutch piston 36a is connected, to operate the right-hand steering clutch 36.

Therefore, when the lever 33 is turned to the left-hand (L.H.) on the contrary, the left-hand steering clutch 35 is connected or disconnected in the same manner as in the above mentioned spool 6 by the operation of the spool 5 by the electric signal to the solenoid valve 7 from the control box 32.

In short, the above mentioned respective spools 5, 6 are operated by the differential pressure between the pressure chambers 14a, 14b and the pressure chambers 15a, 15b on the opposite side, and the oil feeding apertures 16, 17 caused by the opening and closing of the orifices 24, 25 in the solenoid valves 7, 8.

FIG. 2 through FIG. 5 are the diagrams showing an embodiment in which the above described hydraulic controlling device for converging steering is applied to a lateral shaft steering mechanism.

Figure 2:
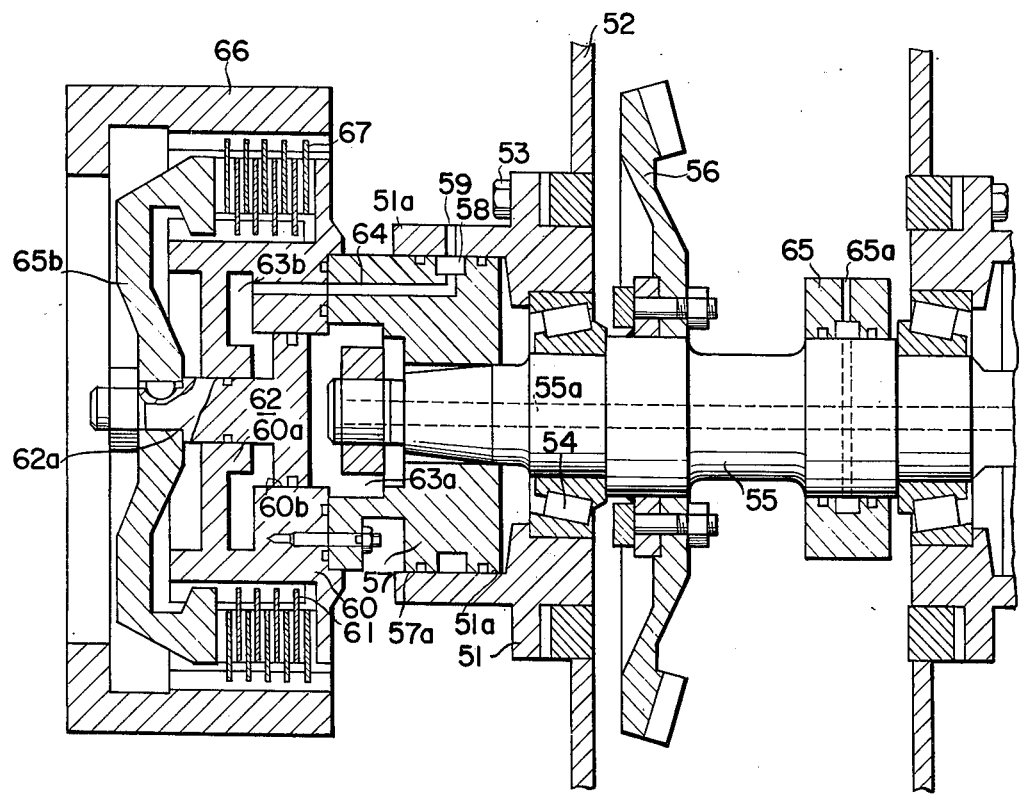
FIG. 2 is a diagram showing partially cut off cross sectional view of lateral shaft steering mechanism of hydraulic system.
Figure 3:
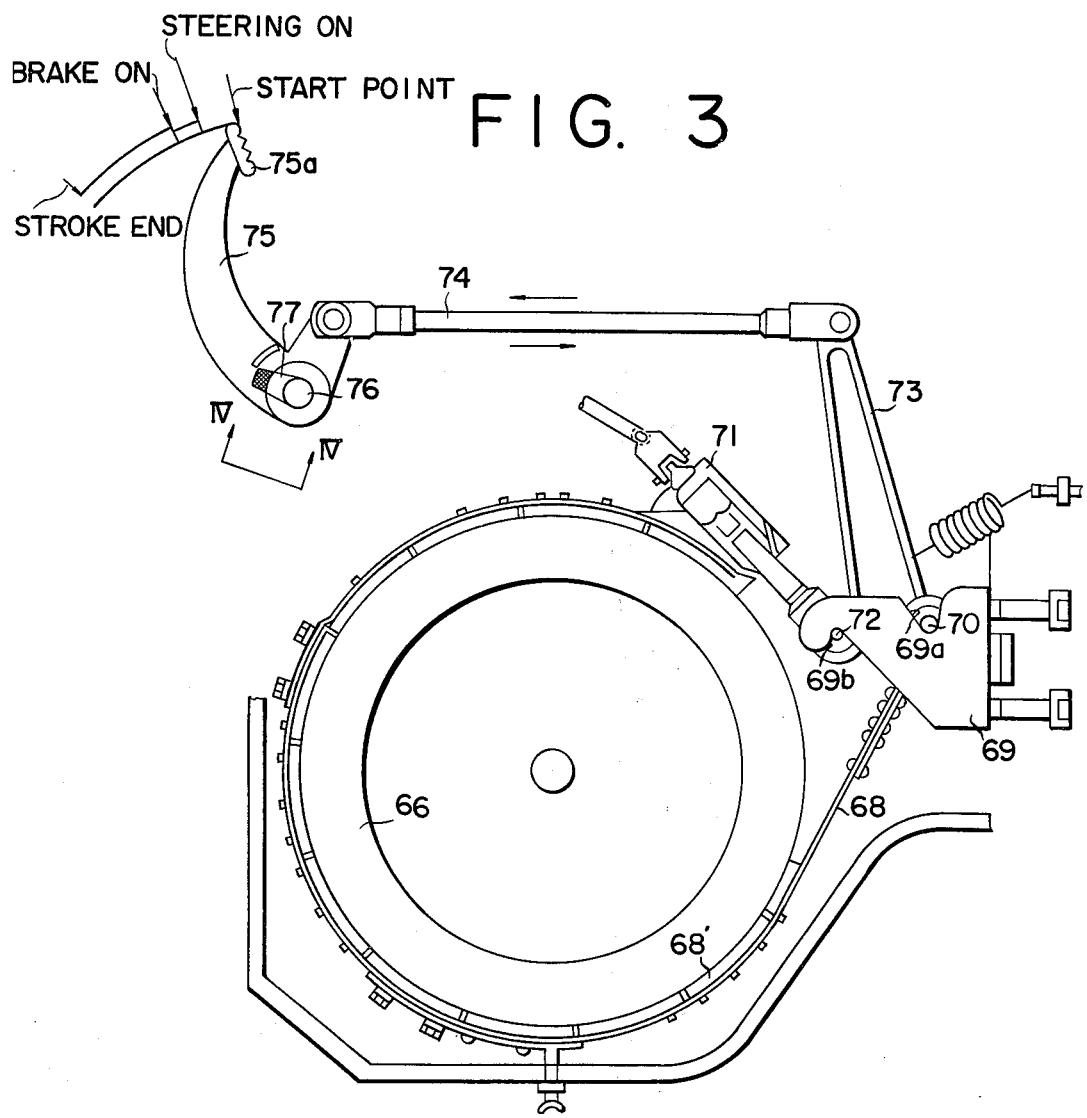
FIG. 3 is a diagram showing the side view of the brake mechanism of anchor system.
Figure 4:
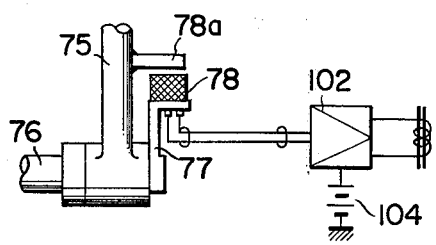
FIG. 4 is a diagram showing the side view of the embodiment of FIG. 3 across IV-IV line.

In FIG. 2, 51 is a gauge attached to the casing 52 by means of bolt 53, and the lateral shaft 55 is supported on said gauge 51 through the bearing 54.

A bevel gear 56 for transmitting power to said lateral shaft 55 from the power source is fixed on said lateral shaft 55.

A hub 57 is fixed on the left end portion of the lateral shaft 55, and the outer peripheral surface 57a of said hub 57 is in contacted with the internal peripheral surface of the cylindrical portion 51a of said gauge 51.

The inner cylinder 60 is secured to the end surface of said hub 57, and a plural number of clutch plates 61 are connected to the outer peripheral portion of said inner cylinder 60.

The bearing portion 60a is provided on the internal peripheral portion of said internal cylinder 60, and the rod portion 62a of the piston 62 is movably supported on said bearing portion 60a.

Said piston 62 is in contact with the internal peripheral surface 60b of the internal cylinder 60, and the bottom side chamber 63a is formed before and after the piston 62 and the head side chamber 63b is connected to said ring form groove 58 through the path 64.

On the other hand, the bottom side chamber 63a is connected to the oil opening 65a of the block 65 movably provided on the lateral shaft 55 through the hole 55a of said lateral shaft 55.

Push-plate 65b is fixed on the end portion of the rod portion 62a.

On the outside of said internal cylinder 60, the outer cylinder 66 is provided, and a plural number of clutch discs 67 are movably connected to the internal peripheral portion of said outer cylinder 66, and said clutch discs 67 are provided between said clutch plates 61.

On the other hand, the right hand steering device (omitted in the diagram), of the same structure as above, is provided on the right side of said lateral shaft 55.

Said outer cylinder 66 plays the role of brake drum, and brake band 68 is provided on the peripheral surface of said outer cylinder 66. Lining material 68' is provided on the inner surface of said brake band 68.

One end portion of said brake band 68 is engaged with the supporting groove 69a which is cut for supporting the supporter 69, and the other end of said brake band 68 is provided on the supporter 71, and said supporter 71 is movably engaged against another supporting groove 69b of the supporter 69 by means of a pin 72.

The pins 72 and 70 are attached to the brake arm 73 in the same manner, and base portion of the brake rod 74 is movably engaged on the end portion of said brake arm 73, and the end portion of the brake rod 74 is attached to the pedal arm 75 having pedal 75a by means of a pin.

Said pedal arm 75 is movably provided on the shaft 76 fixed on the frame, and the bracket 77 is provided on the end portion of said shaft 76, and an access switch 78 is provided on the end of the bracket 77.

On the other hand, on the side surface of the pedal arm 75, a guide 78a is provided, and the pedal arm 75 is rotated by pushing in the pedal 75a, and when the guide 78a approaches said access switch 78, said switch 78 is closed.

Figure 5:
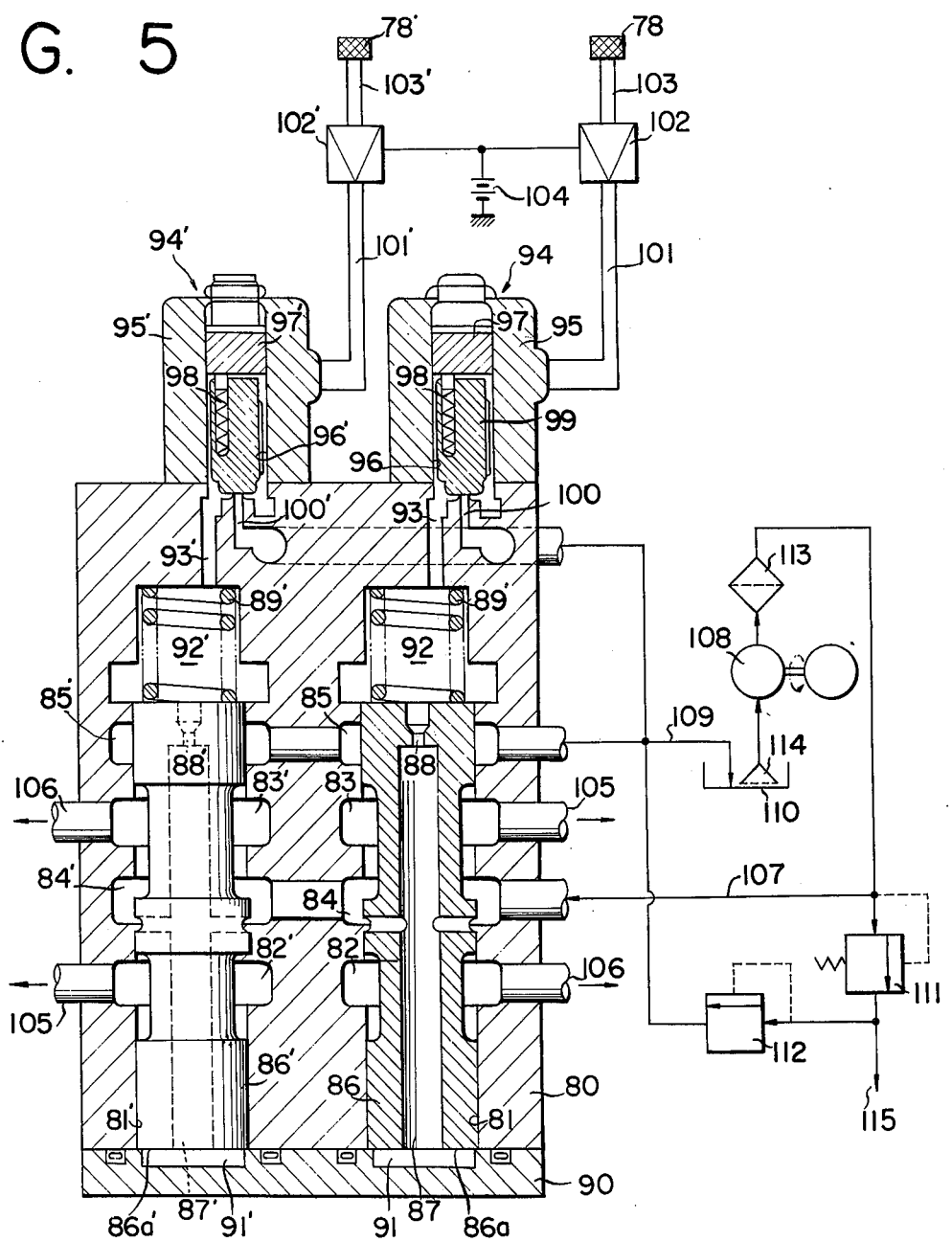
FIG. 5 is a diagram showing a partially cut off cross-section thereof.

FIG. 5 is a diagram showing the control valve applied to the lateral shaft steering device, and insertion orifices 81, 81' are parallelly provided on the valve-body 80 of said control valve, and clutch-ports 82, 82', the clutch-ports 83, 83' and feeding ports 84, 84', drain-ports 85, 85' are provided on said insertion orifices 81, 81'.

Hollow spools 86, 86' are movably inserted into said passages 81,81', and fixed orifices 88, 88' are provided on one end of the hollow portions 87, 87' of said spools 86, 86'.

The spools 86, 86' are pushed downwards by the coil springs 89, 89' as is shown in FIG. 5, and the end surface of the spools 86, 86', i.e., the pressure receiving surfaces 86a, 86'a are contacted against the fringe portion of ten concave portions 91, 91' of the cover 90.

The chambers containing said coil springs 89, 89' are the pressure chambers 92, 92' and said pressure chambers 92, 92' are connected to the bottom portions of the cylinders 96, 96', surrounded with the solenoid coils 95, 95' of the solenoid valves 94, 94' through the orifices 93, 93'.

Iron cores 97, 97' are provided on the top portions of said cylinders 96, 96' and the pistons 99, 99' displaced downwards by the springs 98, 98' are contained in the cylinders 96, 96' and the drain ports 100, 100' are formed on the cylinders 96, 96' and the pistons 99, 99' close the drain ports 100, 100'.

The solenoid coils 95, 95' are connected to the modulators, 102, 102' through the conductors 101, 101', and said modulators 102, 102' are connected to said modulators 102, 102' are connected to said access switches 78, 78' through the conductors 103, 103'.

The two modulators 102, 102' are connected to the power source 104.

The clutch port 83, and the clutch port 82 are connected to the oil orifice 59 of the left hand steering device through the pipe path 105, and the clutch ports 82 and 83' are connected to the oil orifice of the right hand lateral shaft steering device through the path 106.

The feeding ports 84, 84' are connected to the outlet side of the pump 108 through the feeding line 107, and the drain ports 85, 85' are connected to the tank 110 through the drain line 109.

The drain ports 100, 100' are connected to the drain line 109.

111 is a pressure reducing valve; 112 is a pressure adjusting valve; 113 is a filter; 114 is a straightener.

The outlet side of the pressure reducing valve 111 is connected to the oil orifice 65a of the lateral steering device through the path 115.

Thus, the pressurized oil is sent to the clutch port 83 from the feeding line 107 through the feeding port 84, and the pressurized oil flows through the path 64 from said oil port 59 in FIG. 1 through the path 105 and flows into the head side chamber 63b of the piston 62, and pushes said piston 62 right and left to have the pressing plate 65b press-contact said clutch disc 67 against the clutch plate 61, and the torque of the lateral shaft 55 rotated by the power transmitted by the power from the driving source is transmitted to the outer cylinder 66 through the clutch plate 61, and the clutch disc 67.

In the above mentioned case, the oil of the bottom side chamber 63a of the piston 62 is sent back to the tank 110 from the orifice 55a, the oil orifice 65a, path 115, the pressure adjusting valve 112, and the drain line 109.

On the other hand, the oil of the feeding line 107 operates the piston of the right hand steering device from the other clutch port 82' to transmit the torque of the lateral shaft 55.

When the operator pushes the pedal 75a as far as the steering-on-point, the pedal arm 75 is rotated and the guide 78a approaches one of the access switches 78 and said access switch 78 is closed to operate the modulator 102, and electricity is conducted to the solenoid coil 95.

Therefore, the iron core 97 is magnetized, and the piston 99 is raised and the drain port 100 is opened, and therefore the oil of the pressure chamber 92 is sent from the drain port 100 through the drain line 109 to reduce the pressure of the pressure chamber 92.

The spool 86 is transferred against the spring force of the coil spring 89 by the reduction of the pressure of the pressure chamber 92, and the clutch port 83 is connected to the drain port 85, and the oil of the head side chamber 63b of the left hand steering device is drained.

Thereafter, when the pedal is deeply pushed in, the brake band 68 is press-contacted by the lining material 68' thereof against the outer cylinder 66 as the brake drum to control the left hand wheel, and the body rotates in the left hand by the rotation of the right wheel, and on the other hand, the right hand steering is carried out by pushing in the right hand pedal.

When it is desired to go down a slope by utilizing engine braking, both the right and left pedals 25a are pushed in to operate the brake while clutches are being engaged.

Since the present invention is so constructed as to operate the two-way solenoid valve having one orifice by an electric signal produced by operating the lever, to open the aforementioned orifice, to decrease the pressure within the pressure chamber by draining the fluid within the pressure chamber, and to move the spool by the difference pressure between the pressure within the pressure chamber and the feeding pressure as the foregoing description, it does not need the conventional complicated mechanical linkage, but operates remotely the steering turn of caterpillar vehicle.

On the other hand, the solenoid valve opens and closes orifices, and therefore it can be of miniature type which can be operated with little power.

Further, when the brake pedal is pushed in, the guide provided on said brake pedal is approached to the access switch to close said access switch, and the modulator is operated by the closing operation of said access switch to operate the solenoid valve, and the spool of the control valve is transmitted by the operation of said solenoid valve, and therefore the interlocking of the brake and steering control can be done and the troubles given to the operator can be reduced.

What we claim is:

1. A controlling device for a hydraulic system for steering, comprising a valve body, first and second parallel valve spools slidably arranged within said body, first and second pilot valves affixed to said valve body, at least one feeding port, one outlet port and one drain port for each spool formed in the valve body and communicating with each of the first and second spools, first pressure chambers located respectively at the ends of the first spool and second pressure chambers located respectively at the ends of the second spool, an oil feeding restricted orifice and a feeding chamber within each spool connected between the first pressure chambers and between the second pressure chambers, said feeding chambers connected to said feeding ports by a feeding hole in each spool, springs contained in the pressure chambers on at least one end of each spool for continuously urging said spool toward its opposing pressure chamber, each of said chambers containing said spring being selectively connected to exhaust by one of said pilot valves whereby when one said pilot valve is opened, the pressure in the opposing pressure chamber moves the spool and compresses the spring.

2. A controlling device for a hydraulic system for a steering according to claim 1, wherein a pump is connected to said feeding ports, said springs are urged against spring sheet elements located between the respective springs and spools.

3. A controlling device for a hydraulic system for steering according to claim 1 wherein the pilot valves comprises solenoid valves and each contains a valve chamber with oil feeding apertures connecting said valve chamber with at least one of the respective pressure chambers for each spool, drain ports located in each solenoid valve, pistons located in said solenoid valve chambers and springs in contacting relation with each piston.

* * * * *